(12) United States Patent
Han et al.

(10) Patent No.: US 7,173,825 B2
(45) Date of Patent: Feb. 6, 2007

(54) HINGE DEVICE AND ELECTRONIC DEVICE USING THE SAME

(75) Inventors: Young-Soo Han, Anyang-Si (KR); Sung-Hyun Ka, Gunpo-Si (KR)

(73) Assignee: Phoenix Korea Co., Ltd. (KR)

( * ) Notice: Subject to any disclaimer, the term of this patent is extended or adjusted under 35 U.S.C. 154(b) by 337 days.

(21) Appl. No.: 10/850,970

(22) Filed: May 20, 2004

(65) Prior Publication Data

US 2005/0006212 A1 Jan. 13, 2005

Related U.S. Application Data

(63) Continuation-in-part of application No. PCT/KR02/02082, filed on Nov. 8, 2002.

(30) Foreign Application Priority Data

Nov. 21, 2001 (KR) .......................... 10-2001-72712
Mar. 22, 2004 (KR) ................ 20-2004-0007902 U (51) Int. Cl.
*H05K 7/00* (2006.01)
*E05F 1/08* (2006.01)

(52) U.S. Cl. .................. 361/725; 16/330; 455/566; 296/192

(58) Field of Classification Search .. 455/575.2–575.4, 455/566; 16/303, 337, 349, 374; 296/192; 361/679–687, 724–727
See application file for complete search history.

(56) References Cited

U.S. PATENT DOCUMENTS

| | | | |
|---|---|---|---|
| 6,115,886 A | 9/2000 | Fujita | |
| 2004/0244147 A1* | 12/2004 | Qin et al. | ...................... 16/330 |
| 2005/0283945 A1* | 12/2005 | Pan | .............................. 16/221 |

FOREIGN PATENT DOCUMENTS

| JP | 8-65369 | 8/1994 |
|---|---|---|
| JP | 2000-192939 | 7/2000 |
| JP | 2001-185868 | 7/2001 |
| KR | 96-6945 | 12/1992 |
| KR | 94-25244 | 11/1994 |
| KR | 94-27373 | 12/1994 |
| KR | 94-27375 | 12/1994 |
| KR | 95-3838 | 5/1995 |
| KR | 95-16135 | 6/1995 |
| KR | 95-28895 | 10/1995 |
| KR | 96-3356 | 1/1996 |
| KR | 96-9533 | 3/1996 |
| KR | 96-20217 | 6/1996 |
| KR | 96-9192 | 10/1996 |
| KR | 96-34654 | 10/1996 |
| KR | 96-35780 | 11/1996 |
| KR | 97-3514 | 1/1997 |

(Continued)

*Primary Examiner*—Hung Van Duong
(74) *Attorney, Agent, or Firm*—Knobbe, Martens, Olson & Bear, LLP (57) ABSTRACT

The hinge device includes a housing (30), a cam (60), a cam follower (40) to interact with the cam, and a resilient member (80). The housing contains the cam, cam follower and resilient member. The cam moves linearly, and the cam follower rotates. The cam has a peak (76), a valley (77), and a straight line section (78) in which the cam follower holds its position.

19 Claims, 8 Drawing Sheets

FOREIGN PATENT DOCUMENTS

| | | |
|---|---|---|
| KR | 97-9071 | 2/1997 |
| KR | 97-15497 | 4/1997 |
| KR | 97-19181 | 4/1997 |
| KR | 97-47849 | 7/1997 |
| KR | 97-64422 | 12/1997 |
| KR | 20-0261269 | 1/2002 |
| KR | 20-0263833 | 1/2002 |
| KR | 10-2002-0084325 A | 11/2002 |

* cited by examiner

HINGE DEVICE AND ELECTRONIC DEVICE USING THE SAME

RELATED APPLICATIONS

This application claims for the benefit of earlier filing dates under 35 U.S.C. § 119 of Korean Utility Model Application No. 2004/7902, filed Mar. 22, 2004, and under 35 U.S.C. § 365(c) of International Application No. PCT/KR02/02082, filed Nov. 8, 2002, designating the United States, which further claims for the benefit of the earlier filing dates under 35 U.S.C. § 365(b) of Korean Patent Application No. 2001/72712, filed Nov. 21, 2001. International Application No. PCT/KR02/02082, Korean Utility Model Application No. 2004/7902, and Korean Patent Application No. 2001/72712 are hereby incorporated herein by reference in their entirety. International Application No. PCT/KR02/02082 was published in English as WO 03/044974 A1 on May 30, 2003, which is also hereby incorporated herein by reference in its entirety.

BACKGROUND OF THE INVENTION

1. Technical Field of the Invention

The present invention relates generally to a hinge device, and more particularly, to a hinge device for coupling two members in a device such as a portable radiotelephone comprising two members that can be moved to folded and unfolded positions of the device with respect to each other about an axis, if so desired.

2. Description of Related Technology

A portable device such as a portable folder-type radiotelephone includes two members coupled to each other through a hinge device. Usually, one member is provided with a keypad with buttons, and the other member is provided with a liquid crystal display. When the radiotelephone is not in use, the two members are moved to a folded position so that the keypad and the liquid crystal display face each other. Alternatively, when the radiotelephone is in use, the keypad and the liquid crystal display are moved to an unfolded position so that the keypad and display are exposed. The hinge device allows the two members to be coupled to each other and to be smoothly moved to the folded and unfolded positions.

The conventional radiotelephone is usually unfolded or opened only at a single angle. This is because the conventional hinge device has been designed to maintain a stationary state only at a single unfolded angle. However, as recent radiotelephones have a variety of functions, there is inconvenience in using the radiotelephone only at a predetermined, unfolded angle. Therefore, there exists a need for a hinge device that allows a radiotelephone to be unfolded and used at different angles.

SUMMARY OF THE INVENTION

One aspect of the present invention provides a method of operating an electronic device. The method comprises: providing an electronic device comprising a first panel and a second panel, wherein the first and second panel are hingedly connected and rotatable relative to each other about an axis in an opening rotational direction and a closing rotational direction, which is opposite to the opening rotational direction; applying a rotational force to one of the first and second panels to rotate the first panel relative to the second panel in the opening rotational direction beyond a first predetermined angle, at which point the first panel spontaneously rotates in the opening rotational direction relative to the second panel in the absence of an external rotational force applied to the electronic device in the opening rotational direction; allowing the first panel to continue to spontaneously rotate relative to the second panel in the opening rotational direction until the relative rotation of the first panel stops at about a second predetermined angle; applying a rotational force to one of the first and second panels to rotate the first panel relative to the second panel in the opening rotational direction up to an arbitrary angle between the second predetermined angle and a third predetermined angle, at which point the first panel is substantially still relative to the second panel in the absence of an external force applied to the electronic device; and wherein each of the first, second and third predetermined angles is an angle formed between the first and second panels.

The above-described method may further comprise: applying a rotational force to one of the first and second panels to rotate the first panel relative to the second panel in the opening rotational direction beyond the third predetermined angle, at which point the first panel spontaneously rotate relative to the second panel in the closing rotational direction in the absence of an external rotational force in the closing rotational direction; and allowing the first panel to spontaneously rotate relative to the second panel in the closing rotational direction until the relative rotation of the first panel stops. The relative rotation of the first panel in the closing rotational direction may stop at about the third predetermined angle. The method may further comprise: applying a rotational force to one of the first and second panels to rotate the first panel relative to the second panel in the closing rotational direction beyond the first predetermined angle, at which point the first panel spontaneously rotates relative to the second panel in the closing rotational direction in the absence of an external force applied to the electronic device in the closing rotational direction; and allowing the first panel to continue to spontaneously rotate relative to the second panel in the closing rotational direction until the relative rotation of the first panel stops at about zero angle with reference to the second panel. The device may comprise a portable telecommunication device. The first predetermined angle may be an angle from about 10° to about 80°. The second predetermined angle may be an angle from about 90° to about 120°. The third predetermined angle may be an angle from about 130° to about 170°.

Another aspect of the present invention provides a hinge device for use in electronic devices. The hinge device comprises: a cam having a cam surface; a cam follower in contact with the cam surface and configured to move relative to the cam while maintaining the contact with the cam surface; a resilient member configured to keep the cam follower and the cam surface in contact with each other. Along a moving path of the cam follower on the cam surface, the cam surface comprises: a peak, an ascending section ascending toward the peak, the ascending section being so slanted that the cam follower in contact therewith spontaneously slides away from the peak in the absence of an external force applied to the hinge device, a descending section descending from the peak, the descending section being so slanted that the cam follower in contact therewith spontaneously slides away from the peak in the absence of an external force applied to the hinge device, and a free standing section configured such that the cam follower in contact therewith is substantially still relative to the cam in the absence of an external force applied to the hinge device.

Another aspect of the present invention provides an electronic device. The electronic device comprises: a first panel; a second panel; a cam having a cam surface and engaged with the first panel; a cam follower engaged with the second panel and in contact with the cam surface, the cam follower being configured to move along a path on the cam surface; a resilient member configured to keep the cam follower and the cam surface in contact with each other. Along the path of the cam follower on the cam surface, the cam surface comprises: a peak, an ascending section ascending toward the peak, the ascending section being so slanted that the cam follower in contact therewith spontaneously slides away from the peak in the absence of an external force applied to the electronic device, a descending section descending from the peak, the descending section being so slanted that the cam follower in contact therewith spontaneously slides away from the peak in the absence of an external force applied to the electronic device, and a free standing section configured such that the cam follower in contact with the free standing section does not move a substantial distance along the path in the absence of an external force applied to the electronic device.

In the above-described electronic device, one of the cam and cam follower may be configured to rotate about an axis, while the other may be configured to move linearly along the axis. The ascending and descending sections may be slanted with reference to a plane perpendicular to the axis. The free standing section may be substantially flat. The free standing section substantially may comprise a plurality of hills and valleys, and wherein the cam follower in contact with the free standing section moves a distance shorter than a pitch of neighboring hills or neighboring valleys. The ascending and descending sections may be slanted with reference to a plane perpendicular to the axis, and wherein the free standing section may be slanted but be substantially less slanted than the ascending and descending sections. The free standing section may be substantially flat. The efree standing section may be substantially uneven.

An alternative electronic device comprises: a first panel; a second panel; a cam having a cam surface and engaged with the first panel; a cam follower engaged with the second panel and in contact with the cam surface, the cam follower being configured to move along a path on the cam surface; a resilient member configured to keep the cam follower and the cam surface in contact with each other. In this electronic device, one of the cam and cam follower is configured to rotate about an axis in a first rotational direction and in a second rotational direction, while the other is configured to move linearly along the axis, the second rotational direction being opposite to the first rotational direction. Along the path of the cam follower on the cam surface, the cam surface comprises a peak, an ascending section ascending toward the peak, a descending section descending from the peak; and a free standing section. the descending section is configured such that if the cam follower is in contact with the descending section, the first panel spontaneously rotates in the first rotational direction relative to the second panel in the absence of an external rotational force applied to the electronic device in the first rotational direction. The free standing section is configured such that if the cam follower is in contact with the free standing section, the first panel is substantially stopped relative to the second panel in the absence of an external force applied to the electronic device. In this electronic device, the ascending section may be configured such that if the cam follower is in contact with the ascending section, the first panel spontaneously rotates in the second direction relative to the second panel in the absence of an external rotational force applied to the electronic device. The descending and free standing sections abut each other, wherein the cam surface may further comprise an indent at a border between the descending and free standing sections, the indent may be configured to halt the cam follower.

Another aspect of the present invention is to provide a hinge device for allowing a radiotelephone to be unfolded and used at different angles by improving a conventional hinge device.

Another aspect of the present invention is to provide a hinge device that automatically rotates in a certain range of angle, is stopped at an arbitrary position in another range of angle, and is fixed at the other angle.

According to one aspect of the present invention, there is provided a hinge device for coupling a first unit and a second unit which can be relatively rotated with respect to each other to a folded or unfolded position, comprising a cam member with a cam; a cam follower member provided with cam followers interacting with the cam of the cam member; and a resilient member for exerting a force on any one of the cam member and the cam follower member so that the cam followers of the cam follower member can interact with the cam of the cam member. One of the cam member and the cam follower member is mounted in the first unit to linearly move with respect to the first unit and the other is coupled to the second unit to rotate about a rotation axis with respect to the linearly moving member. The cam member has a cam and the cam follower member has a cam following portion. The cam of the cam member includes a peak for causing the linearly moving member of the cam member and the cam follower member to be moved farthest away from the other rotating member, two slant sections having slant surfaces extending from and on both sides of the peak, and an arbitrary position stop section being connected to one of the two slant sections and having a surface thereby providing a stationary state of the cam follower member by friction between the surface of the arbitrary position stop section and the cam following portion.

The end of the arbitrary position stop section may be provided with a groove forming a valley into which the cam following portion is inserted. The hinge device may further comprise a housing that is fixed to the first unit and contains the linearly moving member therein. A guide rod extending along the rotation axis may be fixed to one of the cam member and the cam follower member, and a guide hole into which the guide rod is inserted may be formed on the other of the cam member and the cam follower member, thereby guiding the relative motion between the cam member and the cam follower member. The rotating member of the cam member and the cam follower member may include an extension shaft protruding toward the exterior of the housing, and the hinge device may further comprise a coupling member coupled to the extension shaft and the second unit. The peak may be provided with grooves into which the cam following portion can be inserted. A groove into which the cam following portion can be inserted may be provided at a portion where the one of the slant sections and the arbitrary position stop section meet each other. The arbitrary position stop section may be provided with a plurality of grooves into which the cam following portion can be inserted. The arbitrary position stop section may have a horizontal plane. Alternatively, the arbitrary position stop section may have a reversed slant surface which slopes reversely to the slant surface of the connected slant section.

BRIEF DESCRIPTION OF THE DRAWINGS

Preferred embodiments of the present invention will be described with reference to the accompanying drawings so that those skilled in the art can clearly understand the objects and features of the present invention.

DETAILED DESCRIPTION OF THE EMBODIMENTS

Figure 1:
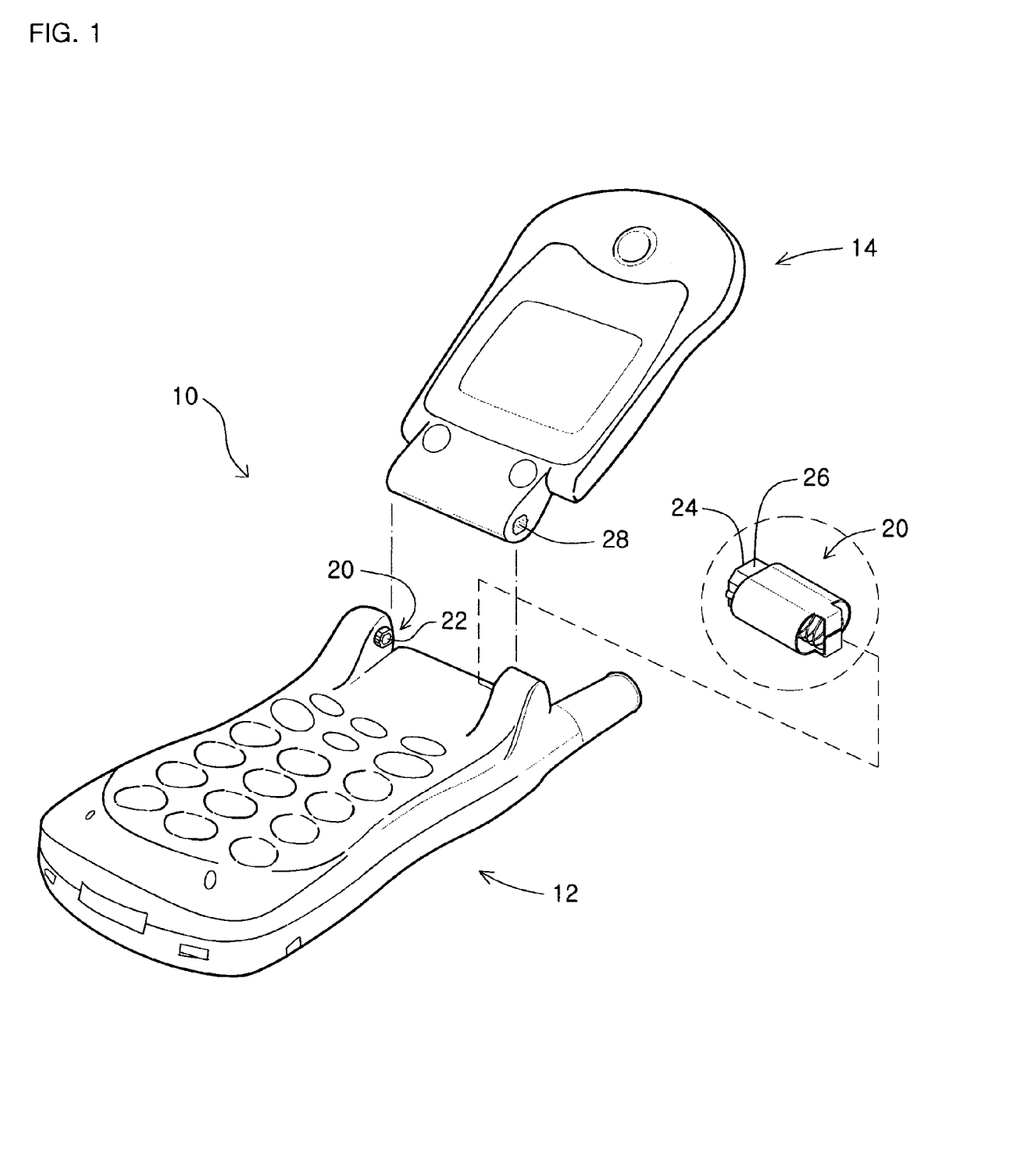
FIG. 1 is a perspective view of a folder-type radiotelephone comprising a hinge device according to an embodiment of the present invention, with a first case unit and a second case unit disassembled and with a disassembled hinge device shown on an enlarged scale.

Referring to FIG. 1, a portable folder-type radiotelephone 10 comprises a first case unit 12 provided with a keypad, and a second case unit 14 provided with a liquid crystal display. Hinge devices 20 are mounted at both sides of a coupling portion between the first case unit 12 and the second case unit 14. The hinge devices 20 are inserted into mounting holes of the first case unit 12 and the second case unit 14 is then coupled to the hinge devices 20. The shape and size of the mounting holes generally correspond to those of the hinge devices 20. This is to prevent the hinge devices 20 from escaping from the mounting holes and to cause the hinge devices to be fixed to and not to rotate with respect to the first case unit 12.

Each of the hinge devices 20 includes a rotatable extension shaft 22 that protrudes toward the second case unit 14. A coupling member 24 is fitted over the extension shaft 22. The coupling member 24 includes an engaging surface 26. The second case unit 14 is provided with coupling holes 28 into which the coupling members 24 of the hinge devices are fitted. Each of the coupling holes 28 has an engaging surface interacting with the engaging surface 26. Alternatively, the second case unit may be provided with the extension shaft, whereas each of the hinge devices may be provided with the coupling hole. Further, the extension shaft 22 may be engaged directly to the second case unit 14 without the coupling member 24.

Figure 2:
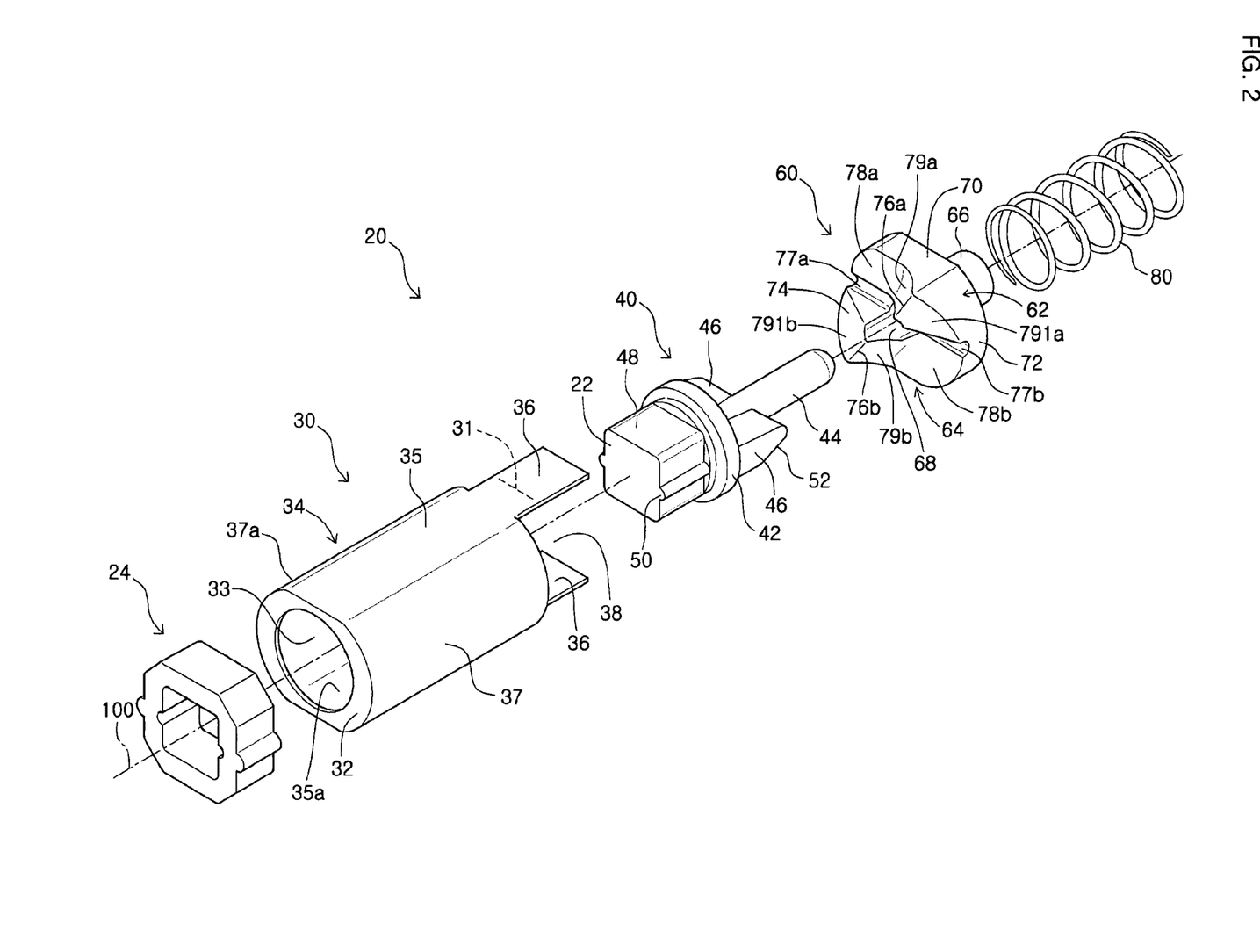
FIG. 2 is an exploded perspective view of the hinge device of FIG. 1.

Referring to FIG. 2, each of the hinge devices 20 comprises a housing 30, and a cam follower member 40, a cam member 60, a resilient member 80 and the coupling member 24 which are sequentially accommodated in the housing 30.

The housing 30 comprises an elongated can. A longitudinal centerline of the housing 30 defines a rotation axis 100 of the hinge device 20. The housing 30 comprises an end wall 32 formed at one end thereof, a sidewall 34 formed to extend from the end wall 32, and extension protrusions 36 extending from portions of the sidewall 34. The other end 38 opposite to the end with the end wall 32 formed is open. The end wall 32 is provided with a shaft hole 33. The sidewall 34 includes opposite flat walls 35, 35a and opposite arc-shaped walls 37, 37a. When the housing is fitted into the case unit of the radiotelephone, the flat walls 35, 35a function as keys for preventing the rotation of the hinge device. In addition, as will be described later, the flat walls also function to prevent rotation of the cam member 60 accommodated in the housing. The extension protrusions 36 are formed to extend from the opposite flat walls 35, 35a. After the cam follower member 40, the cam member 60 and the resilient member 80, which will be described later, are inserted into the housing 30, the protrusions 40 are bent to cover the open end 38.

However, the present invention is not limited to such a method of covering the open end. As for a method of covering the open end 38 to prevent the resilient member 80 from protruding outward, methods other than bending the extension protrusions 36 may be used. Without additional protrusions, the open end may be covered by deforming a wall portion on the side of the open end of the housing after the inner parts are inserted into the housing. In addition, a cap may be manufactured and then fixed to the open end to be covered with the cap after the parts are inserted into the housing.

It is preferred that the housing 30 be formed of a metallic material such as a brass plate and be manufactured by using a deep drawing method. Alternatively, the housing may be formed by injection molding plastic resin material.

The cam follower member 40 includes a disk-shaped support 42, the extension shaft 22 extending from the support 42 along the rotation axis 100, a guide rod 44 extending from the support 42 in a direction opposite to the extension shaft 22 along the rotation axis 100, and cam follower protrusions 46 formed at both sides of the guide rod 44.

The extension shaft 22 includes engaging surfaces 48 and engaging protrusions 50 formed on the engaging surfaces 48. In a case where there is no coupling member 24, the engaging surfaces 48 and the engaging protrusions 50 are engaged directly with the case unit. The guide rod 44 is an elongated and slender cylindrical rod extending from the center of the support 42. The two cam follower protrusions 46 are formed to be in close contact with the sides of the guide rod 44. The cam follower protrusions 46 extend together with the guide rod 44 in a direction parallel to the rotation axis 100 by a length shorter than that of the guide rod 44. The two cam follower protrusions 46 are symmetrically disposed with respect to the rotation axis 100 of the hinge device 20. The two cam follower protrusions 46 form cam followers. The cam followers refer to portions interacting with a cam surface to be described later. Each of the cam follower protrusions 46 is provided with a slant surface 52 by which the thickness of the cam follower protrusion is reduced toward its tip end, which is rounded. It can be understood by those skilled in the art that the thickness, gradient and curvature of the tip end of the cam follower protrusion may be determined to interact with stopping grooves formed on the cam surface to be described later. Of course, the configuration of the cam followers is not limited to that of the aforementioned cam follower protrusions 46. The cam followers may comprise pillars separated from the guide rod.

The cam follower member 40 is inserted through the open end 38 of the housing 30. The cam follower member 40 can rotate about the rotation axis 100 within the housing 30. The extension shaft 22 of the cam follower member 40 protrudes through the shaft hole 33 of the housing 30.

The coupling member 24 is fitted over the extension shaft 22. The coupling member 24 is provided for the purpose of increasing the distance from the rotation axis 100 to the engaging surfaces, the area of the engaging surfaces and the size of the engaging protrusions, thereby ensuring transmission of the rotation of the cam follower member 40 to the case unit of the radiotelephone. Depending on the configuration of the case unit, there may be no need for a coupling member.

The cam member 60 includes a sidewall 62, a cam portion 64 formed at one side of the cam member 60 facing the cam follower member 40, and a cylindrical boss 66 formed to extend from the center at the other side of the cam member 60 opposite to the cam portion 64. The boss 66 is provided with a through-hole 68 extending along the rotation axis 100 to penetrate through the boss 66 from the cam portion 64. The guide rod 44 fixed to the cam follower member 40 is fitted into the through-hole 68, which penetrates through the boss 66 from the cam portion 64, so that the relative motion of the guide rod 44 is guided.

Figure 3:
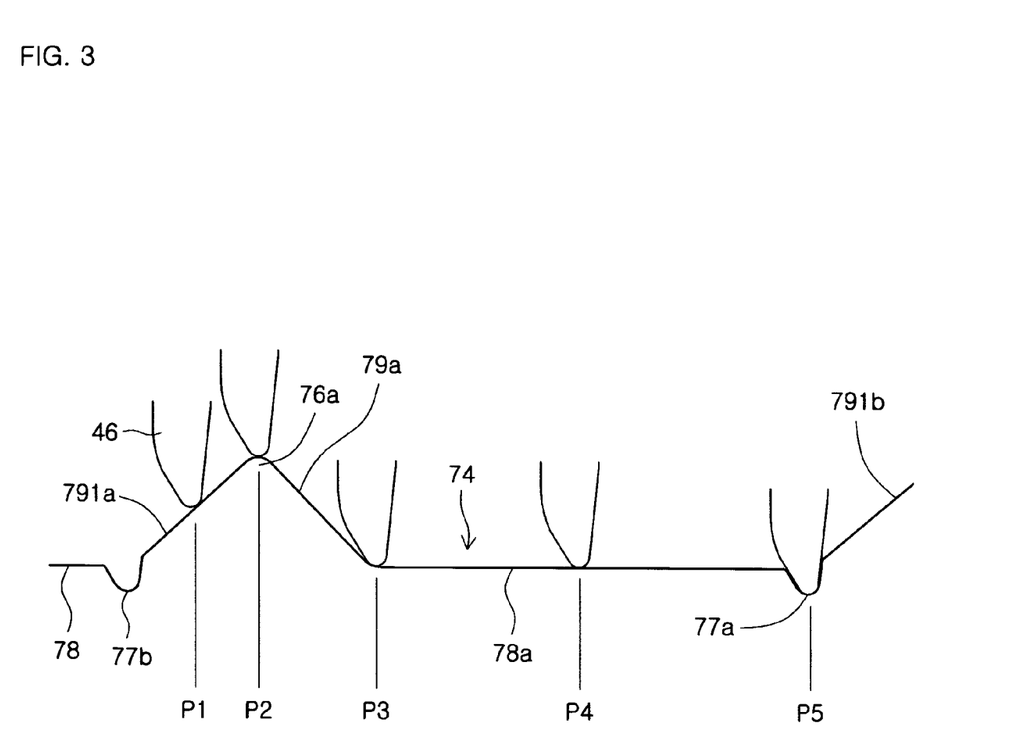
FIG. 3 shows a deployed cam surface of the hinge device of FIG. 1.

The sidewall 62 includes opposite flat walls 70 and opposite arc-shaped walls 72 in the same shape as the sidewall 34 of the housing 30. The cam member 60 constructed as such is fitted into the housing 30 to linearly move along the rotation axis 100 but not to rotate. The cam portion 64 includes a cam surface 74 formed on the side of the cam member facing the cam follower member 40. The cam portion 64 includes two peaks 76a, 76b opposing diametrically with respect to the rotation axis 100, and two valleys 77a, 77b in the form of fixing grooves opposing diametrically with respect to the rotation axis 100. The peak 76a and the valley 77a are connected to each other by a slant surface 79a extending from the peak 76a and a horizontal plane section (or linear section) 78a extending from the slat surface 79a to the valley 77a. A slant surface 791a is provided between the peak 76a and the valley 77b. Likewise, a slant surface 79b and a horizontal plane section (or linear section) 78b are also provided between the peak 76b and the valley 77b. A slant surface 791b is provided between the peak 76b and the valley 77a.

The cam member 60 is inserted through the open end 38 of the housing 30. At this time, the cam surface 74 is oriented to face the cam follower protrusions 46 of the cam follower member 40. The cam member 60 is snugly inserted into the housing 30 so that its linear motion within the housing 30 along the rotation axis 100 is allowable, but its rotational motion within the housing 30 is limited.

The resilient member 80 urges the cam member 60 against the cam follower member 40. The resilient member 80 is preferably a compression coil spring.

After the cam follower member 40, the cam member 60 and the resilient member 80 are sequentially inserted into the housing 30, the open end of the housing 30 is partially covered by bending the extension protrusions 36 of the housing 30 along bending lines 31.

The cam member, the cam follower member and the resilient member are manufactured by injection molding plastic resin material, and preferably engineering plastic resin material. Further, the cam member and the cam follower member may be manufactured by sintering or cold forging metallic material.

Hereinafter, the operation of the hinge device 20 according to the embodiment of the present invention will be explained with reference to FIGS. 3, 4(a) to (d) and 5.

Figure 4:
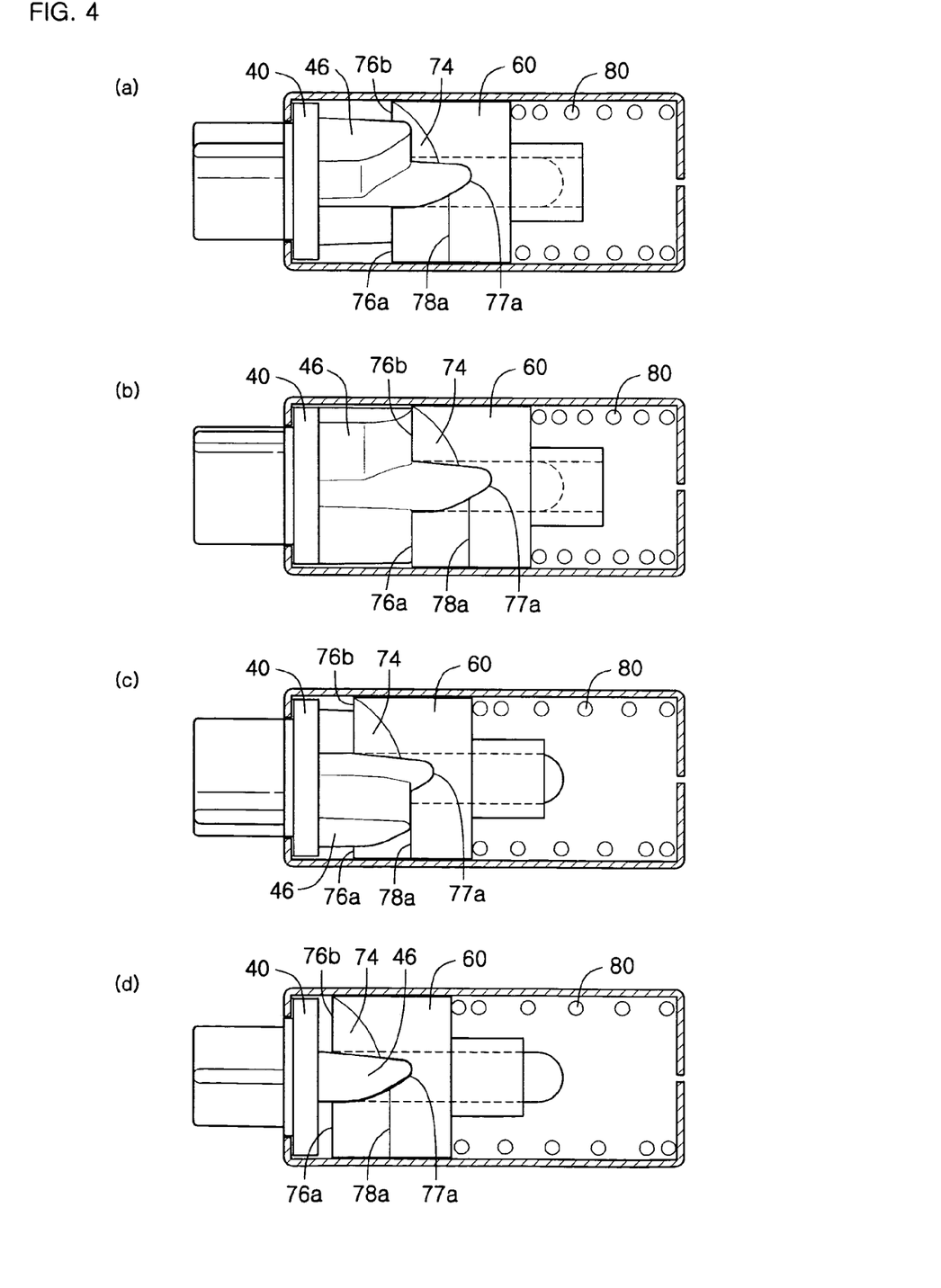
FIGS. 4(a) to (c) are views showing sequential operations of the hinge device, with a housing cut therethrough to show the interior of the housing.
Figure 5:
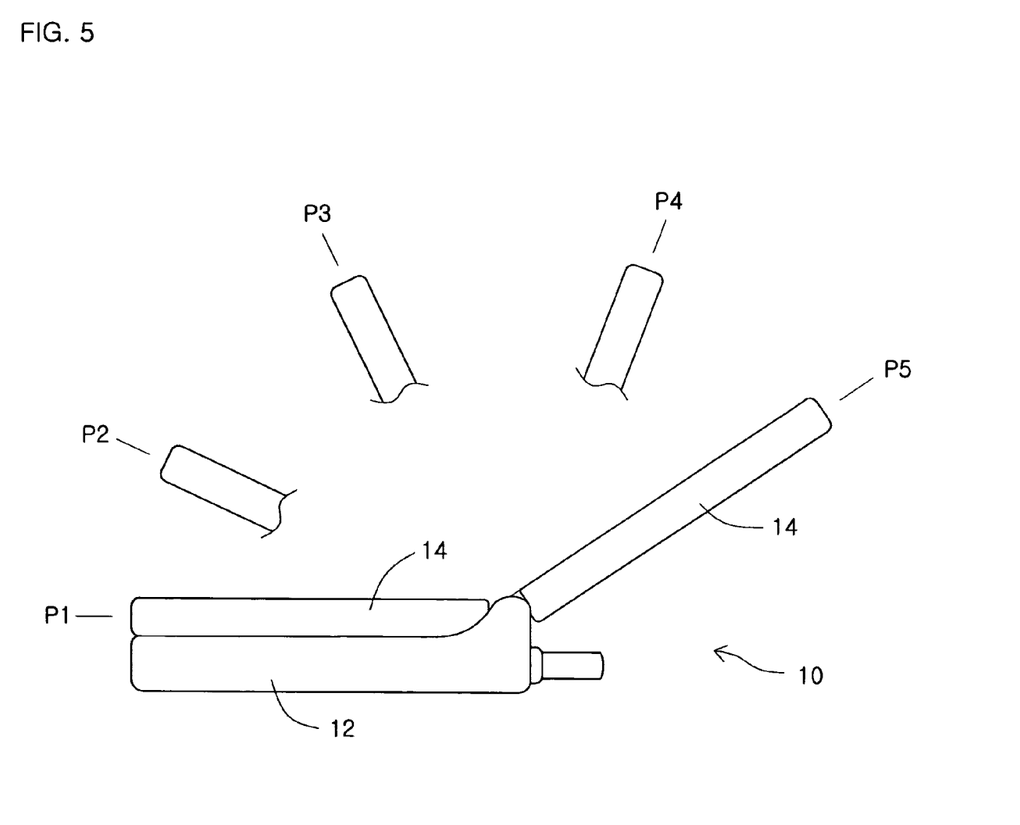
FIG. 5 is a side view showing folded and unfolded states of the radiotelephone of FIG. 1.

When the second case unit is positioned at position Pl in FIG. 5, the radiotelephone 10 is in a completely folded state. The state of the hinge device when the second case unit is disposed at position P1 is shown in FIG. 4(a), and the position of one of the cam follower protrusions 46 on the cam surface 74 corresponds to position P1 in FIG. 3. In this state, the cam follower protrusion 46 is disposed on the slant surface 791a between the peak 76a and the valley 77b of the cam surface 74. At position P1, the cam member 60 pushes the cam follower member 40 by the force of the resilient member 80. At this time, the cam follower member 40 is subjected to a rotational force by the resilient member 80 and the slant surface 791a. The rotational force causes the second case unit 14 to rotate toward the first case unit 11. That is, the hinge device generates the force, which causes the first case unit 12 and the second case unit 14 to be in close contact with each other, at position P1. Therefore, the radiotelephone 10 is stably maintained in the folded state.

Under this condition, when the case units are moved away from each other in order to open the radiotelephone 10 so that the radiotelephone 10 can be in use, the cam follower protrusion 46 reaches the peak 76a of the cam surface 74. This state is shown in FIG. 4(b), which corresponds to position P2 in FIGS. 3 and 5. When the case units are moved further away from each other, the cam follower protrusion 46 goes over the peak 76a of the cam surface 74. When the cam follower protrusion 46 goes over the peak 76a of the cam surface 74, the resilient member 80 urges the cam member 60 against the cam follower member 40. Thus, the cam follower protrusion 46 slides down along the slant surface 79a of the cam surface 74 without external force, and stops at position P3 in FIGS. 3 and 5 where the slant surface 79a terminates.

In order to cause the second case unit 14 to move further away from the first case unit from position P3, an external rotational force should be continuously exerted thereon. If the rotational force is not temporarily exerted during the movement of the second case unit 14, the second case unit 14 stops at that position and is maintained at the position by the friction between the cam follower and the cam surface caused by the force of the resilient member 80. At this time, the cam follower protrusion 46 is disposed at a position on the horizontal plane section 78a. This state is shown in FIG. 4(c) and corresponds to position P4 in FIGS. 3 and 5. When the second case unit 14 disposed at position P4 is further moved away from the first case unit and reaches position P5, the cam follower protrusion 46 is inserted into the valley 77a in the form of the groove of the cam surface 74 and secured therein. FIG. 4(d) shows the hinge device in this state. That is, the second case unit is maintained in such a stable stationary state at an arbitrary angle between positions P3 and P5.

Now, the operation of the hinge device will be explained in connection with a process of switching the radiotelephone from the unfolded state into the folded state. That is, a process of changing the position of the second case unit from position P5 to position P1 in FIG. 5 will be explained. In the state where the radiotelephone is fully unfolded (position P5 in FIGS. 3 and 5, FIG. 4(d)), the cam follower protrusion 46 is inserted into and secured in the valley 77a. In this state, a force should be exerted up to position P2 in order to fold the radiotelephone. When a force beyond a predetermined threshold is exerted in the secured state, since the slant surface is provided around the valley 77a, the cam follower protrusion 46 slides up along the slant surface and reaches the horizontal plane section 78a. Since the cam follower protrusion 46 passes along the horizontal plane section 78a up to position P3, the second case unit can be rotated with a constant rotational force. However, since the cam follower protrusion should pass along the upward slant surface 79a from position P3 to position P2, it is necessary to exert a larger rotational force. After the cam follower protrusion 46 goes over the peak 76a (position P2), it passes along the downward slant surface 791a. Thus, it automatically reaches position P1 without an external rotational force, so that the radiotelephone is in the folded state.

Figure 6:
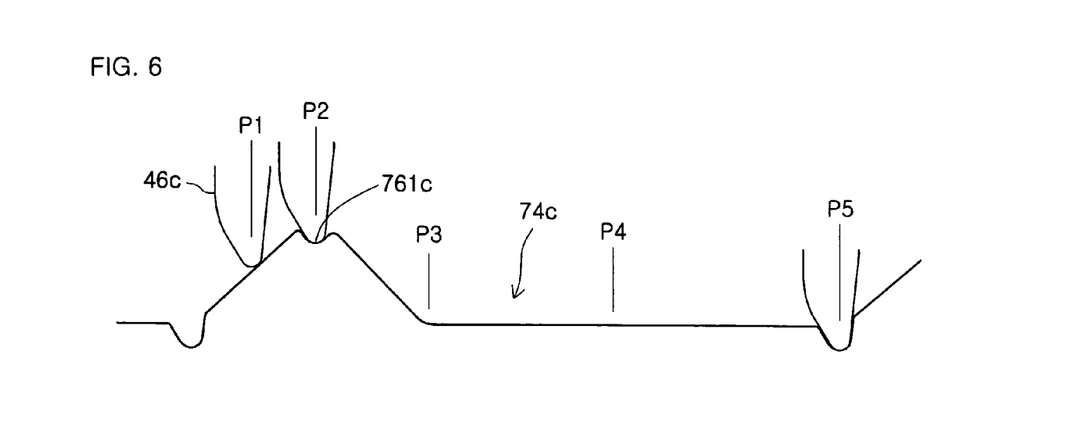
FIG. 6 is a view showing a deployed cam surface in a second embodiment of a cam member of the hinge device of FIG. 1.
Figure 7:
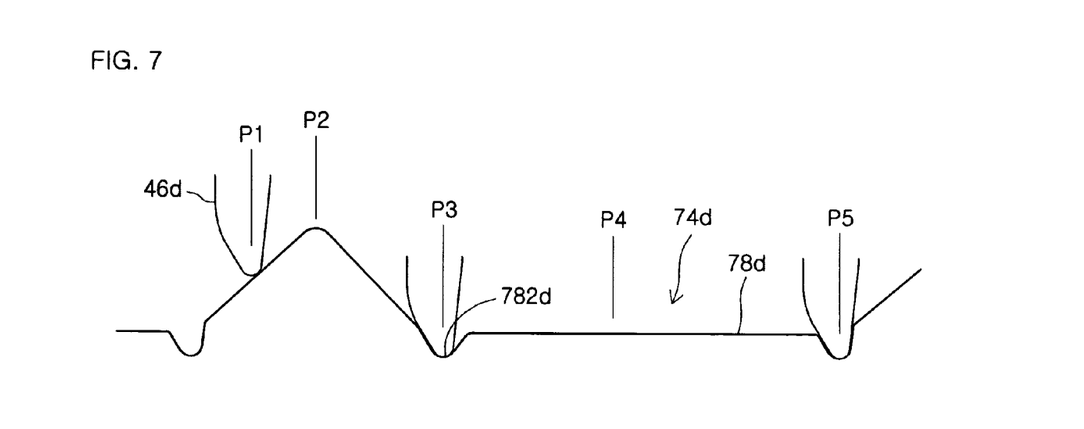
FIG. 7 is a view showing a deployed cam surface in a third embodiment of the cam member of the hinge device of FIG. 1.
Figure 8:
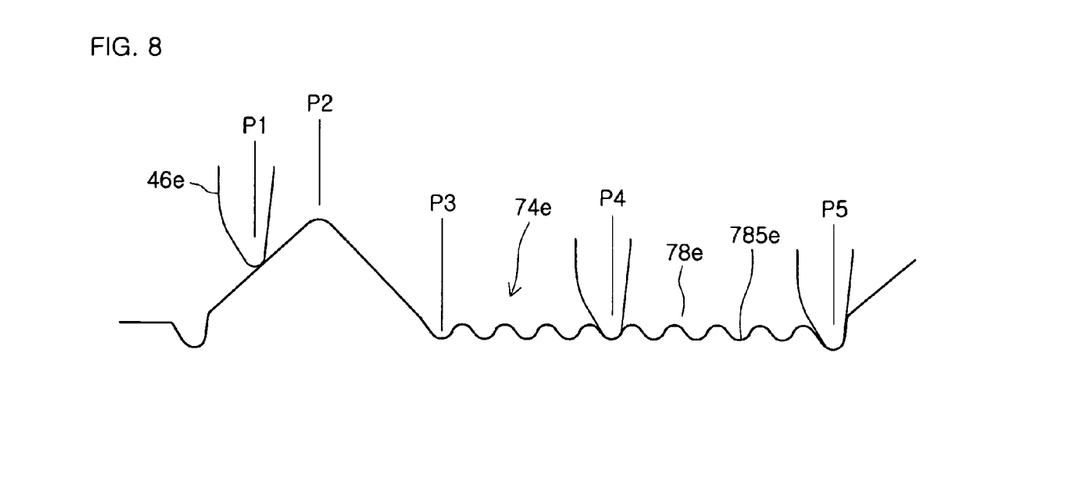
FIG. 8 is a view showing a deployed cam surface in a fourth embodiment of the cam member of the hinge device of FIG. 1.

FIGS. 6 to 8 show other embodiments of the cam portion in a deployed state. Referring to FIG. 6, a cam surface 74c is the same as the cam surface 74 shown in FIG. 3 except that it further includes grooves 761c provided at the peaks. Cam follower protrusions 46c can be inserted into and secured in the grooves 761c. The cam follower protrusions 46c move between position P1 and position P5 in the same manner as the embodiment shown in FIG. 3. When the cam follower protrusions 46c are inserted into the grooves 761c at the peaks (position P2), the unfolded or opened state of the radiotelephone corresponds to position P2 in FIG. 5. The operations at the other positions are the same as the embodiment shown in FIG. 3. Referring to FIG. 7, a cam surface 74d is the same as the cam surface 74 shown in FIG. 3 except that it further includes grooves 782d provided at the beginnings of linear sections 78d. Cam follower protrusions 46d can be inserted into and secured in the grooves 782d. The cam follower protrusions 46d move between position P1 and position P5 in the same manner as the embodiment shown in FIG. 3. When the cam follower protrusions 46d are inserted into the grooves 782d (position P3), the unfolded or opened state of the radiotelephone corresponds to position P3 in FIG. 5. The operations at the other positions are the same as the embodiment shown in FIG. 3. Referring to FIG. 8, a cam surface 74e is the same as the cam surface 74 shown in FIG. 3 except that it further includes a plurality of grooves 785e provided in the linear section 78e. Cam follower protrusions 46e can be inserted into and secured in each of the plurality of grooves 785e. The cam follower protrusions 46e moves between position P1 and position P5 in the same manner as the embodiment shown in FIG. 3. When each of the cam follower protrusions 46e is inserted into any one of the plurality of grooves 785e (position P4), the unfolded or opened state of the radiotelephone corresponds to position P4 in FIG. 5. The operations at the other positions are the same as the embodiment shown in FIG. 3.

Figure 9:
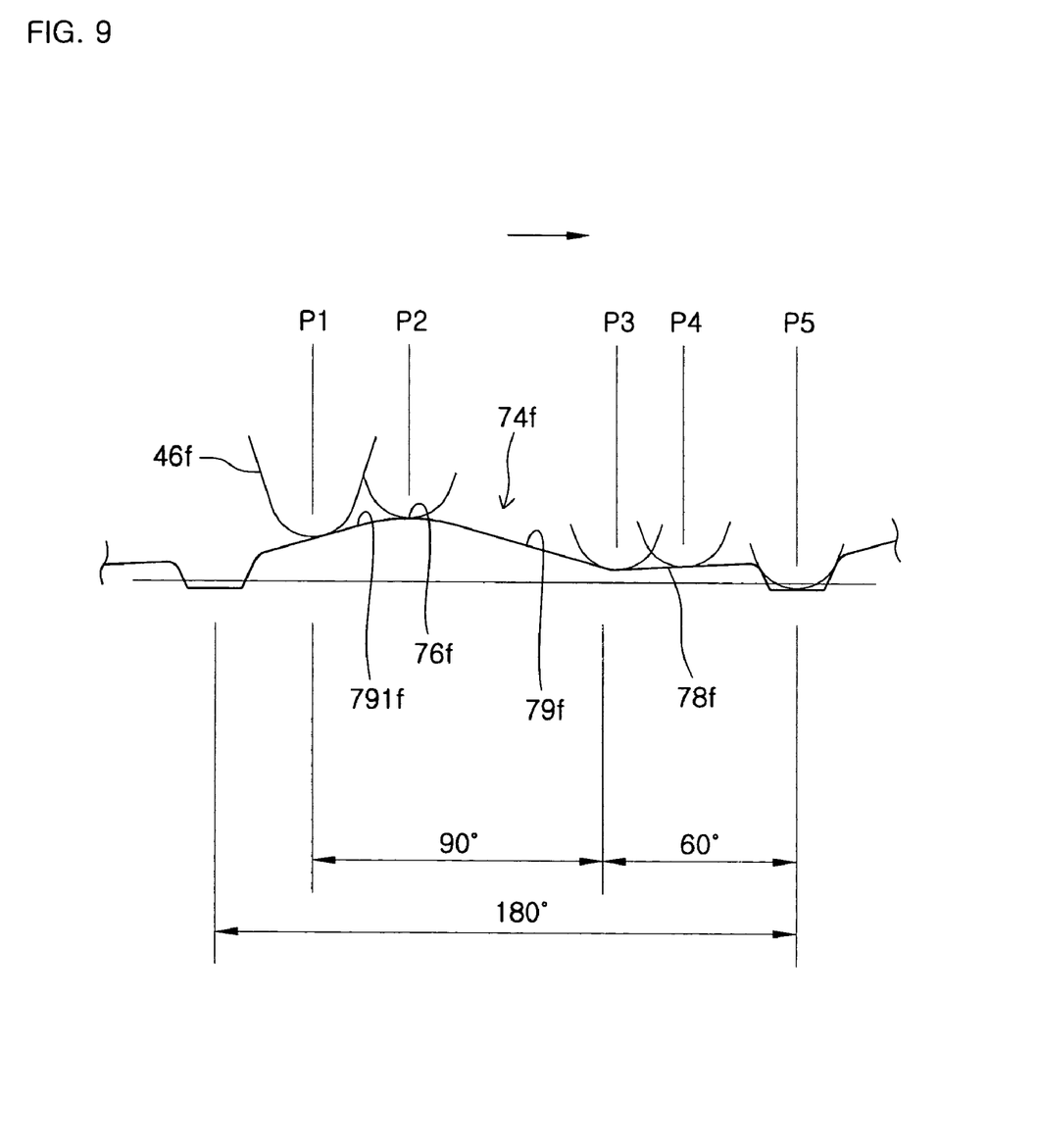
FIG. 9 is a view showing a deployed cam surface in a third embodiment of the cam member of the hinge device of the present invention.
Figure 10:
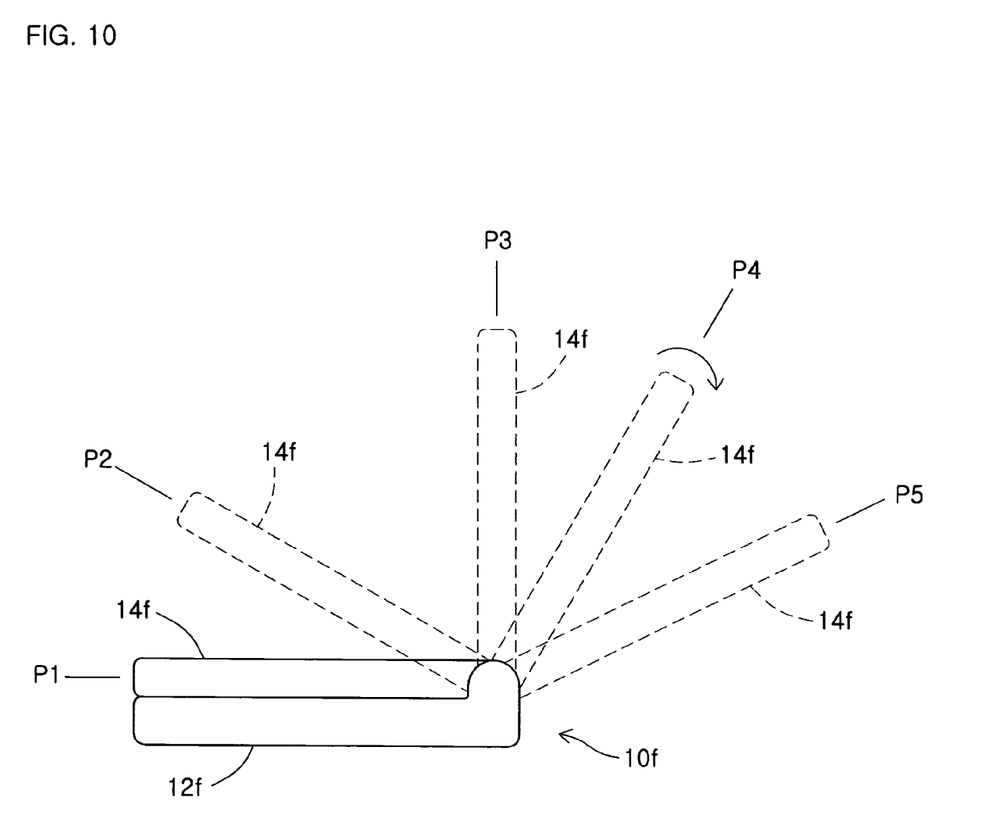
FIG. 10 is a side view showing folded and unfolded states of the radiotelephone including the hinge device having the cam of FIG. 9.

Referring to FIG. 9, the configuration of a cam surface 74f is similar to that of the cam surface 74 shown in FIG. 3. The cam surface 74f has a peak 76f and slant surfaces 79f and 791f extending from the both sides of the peak 76f. However, the position P3 which is the end of the slant surface 79f is relatively distant from the peak 76f, comparing to the cam of the above embodiments. Thus, when a cam follower 46f goes downwardly along the slant surface 79f and stops at the position P3, the angle between a first case unit 12f and second case unit 14f becomes 90 degree as shown in FIG. 10.

Referring back to FIG. 9, the cam surface 74f has a reversed slant surface section 78f positioned between the positions P3 and P5 so that the reversed slant surface section 78f gradually rises when going to the position P5. When the cam following protrusion 46f is disposed at the position P4 on the reversed slant surface section 78f, the force urging the cam follower toward the position P3 is generated. In this state, however, the rotation force which intends to rotate the second case unit 14f disposed the position P4 toward the position P5 is generated by the weight of the second case unit 14f itself as shown in FIG. 10 with an arrow. As a result, the reversed slant surface section 78f functions the compensation for the rotation force of the second case unit 14f disposed at the position P4 as shown in FIG. 10. It can be understood by those skilled in the art that the gradient of the reversed slant surface 78f can be determined by considering the weight of the second case unit 14f. Thus, the configuration of the hinge device having the cam surface 74f shown in FIG. 9 provides the more stable stationary state in the arbitrary position stop section. Although the reversed slant section 78f is shown as a straight line in FIG. 9, it can be a curved line. In addition, although the angles of the second case unit are described in FIGS. 9 and 10, the present invention is not be limited thereto.

As above, the horizontal plane sections 78, 78c, 78d and 78e and the reversed slant surface section 78f function as the arbitrary position stop section. The arbitrary position stop section may be called as friction stop section or free-stop section.

Although the present invention has been described in connection with the preferred embodiments, it will be understood that various modifications and changes can be made thereto without departing from the scope and spirit of the present invention.

What is claimed is:

1. A method of operating an electronic device, comprising:

providing an electronic device comprising a first panel and a second panel, wherein the first and second panel are hingedly connected and rotatable relative to each other about an axis in an opening rotational direction and a closing rotational direction, which is opposite to the opening rotational direction;

applying a rotational force to one of the first and second panels to rotate the first panel relative to the second panel in the opening rotational direction beyond a first predetermined angle, at which point the first panel spontaneously rotates in the opening rotational direction relative to the second panel in the absence of an external rotational force applied to the electronic device in the opening rotational direction;

allowing the first panel to continue to spontaneously rotate relative to the second panel in the opening rotational direction until the relative rotation of the first panel stops at about a second predetermined angle;

applying a rotational force to one of the first and second panels to rotate the first panel relative to the second panel in the opening rotational direction up to an arbitrary angle between the second predetermined angle and a third predetermined angle, at which point the first panel is substantially still relative to the second panel in the absence of an external force applied to the electronic device; and wherein each of the first, second and third predetermined angles is an angle formed between the first and second panels.

2. The method of claim 1, further comprising:

applying a rotational force to one of the first and second panels to rotate the first panel relative to the second panel in the opening rotational direction beyond the third predetermined angle, at which point the first panel spontaneously rotate relative to the second panel in the closing rotational direction in the absence of an external rotational force in the closing rotational direction; and allowing the first panel to spontaneously rotate relative to the second panel in the closing rotational direction until the relative rotation of the first panel stops.

3. The method of claim 1, further comprising:

applying a rotational force to one of the first and second panels to rotate the first panel relative to the second panel in the closing rotational direction beyond the first predetermined angle, at which point the first panel spontaneously rotates relative to the second panel in the closing rotational direction in the absence of an external force applied to the electronic device in the closing rotational direction; and allowing the first panel to continue to spontaneously rotate relative to the second panel in the closing rotational direction until the relative rotation of the first panel stops at about zero angle with reference to the second panel.

4. The method of claim 1, wherein the device comprises a portable telecommunication device.

5. The method of claim 1, wherein the first predetermined angle is an angle from about 10° to about 80°.

6. The method of claim 1, wherein the second predetermined angle is an angle from about 90° to about 120°.

7. The method of claim 1, wherein the third predetermined angle is an angle from about 130° to about 170°.

8. The method of claim 2, wherein the relative rotation of the first panel in the closing rotational direction stops at about the third predetermined angle.

9. An electronic device, comprising:

a first panel;

a second panel;

a cam having a cam surface and engaged with the first panel;

a cam follower engaged with the second panel and in contact with the cam surface, the cam follower being configured to move along a path on the cam surface;

a resilient member configured to keep the cam follower and the cam surface in contact with each other;

wherein along the path of the cam follower on the cam surface, the cam surface comprises:

a peak, an ascending section ascending toward the peak, the ascending section being so slanted that the cam follower in contact therewith spontaneously slides away from the peak in the absence of an external force applied to the electronic device, a descending section descending from the peak, the descending section being so slanted that the cam follower in contact therewith spontaneously slides away from the peak in the absence of an external force applied to the electronic device, and a free standing section configured such that the cam follower in contact with the free standing section does not move a substantial distance along the path in the absence of an external force applied to the electronic device.

10. The electronic device of claim 9, wherein one of the cam and cam follower is configured to rotate about an axis, while the other is configured to move linearly along the axis.

11. The electronic device of claim 9, wherein the free standing section is substantially flat.

12. The electronic device of claim 9, wherein the free standing section substantially comprises a plurality of hills and valleys, and wherein the cam follower in contact with the free standing section moves a distance shorter than a pitch of neighboring hills or neighboring valleys.

13. The electronic device of claim 10, wherein the ascending and descending sections are slanted with reference to a plane perpendicular to the axis, and wherein the free standing section is slanted but is substantially less slanted than the ascending and descending sections.

14. The electronic device of claim 13, wherein the free standing section is substantially flat.

15. The electronic device of claim 9, wherein the free standing section is substantially uneven.

16. The electronic device of claim 10, wherein the ascending and descending sections are slanted with reference to a plane perpendicular to the axis.

17. An electronic device, comprising:

a first panel;

a second panel;

a cam having a cam surface and engaged with the first panel;

a cam follower engaged with the second panel and in contact with the cam surface, the cam follower being configured to move along a path on the cam surface;

a resilient member configured to keep the cam follower and the cam surface in contact with each other;

wherein one of the cam and cam follower is configured to rotate about an axis in a first rotational direction and in a second rotational direction, while the other is configured to move linearly along the axis, the second rotational direction being opposite to the first rotational direction;

wherein along the path of the cam follower on the cam surface, the cam surface comprises a peak, an ascending section ascending toward the peak, a descending section descending from the peak; and a free standing section;

wherein the descending section is configured such that if the cam follower is in contact with the descending section, the first panel spontaneously rotates in the first rotational direction relative to the second panel in the absence of an external rotational force applied to the electronic device in the first rotational direction;

wherein the free standing section is configured such that if the cam follower is in contact with the free standing section, the first panel is substantially stopped relative to the second panel in the absence of an external force applied to the electronic device.

18. The electronic device of claim 17, wherein the ascending section is configured such that if the cam follower is in contact with the ascending section, the first panel spontaneously rotates in the second direction relative to the second panel in the absence of an external rotational force applied to the electronic device.

19. The electronic device of claim 17, wherein the descending and free standing sections abut each other, wherein the cam surface further comprises an indent at a border between the descending and free standing sections, the indent is configured to halt the cam follower.

* * * * *